Figure 1:
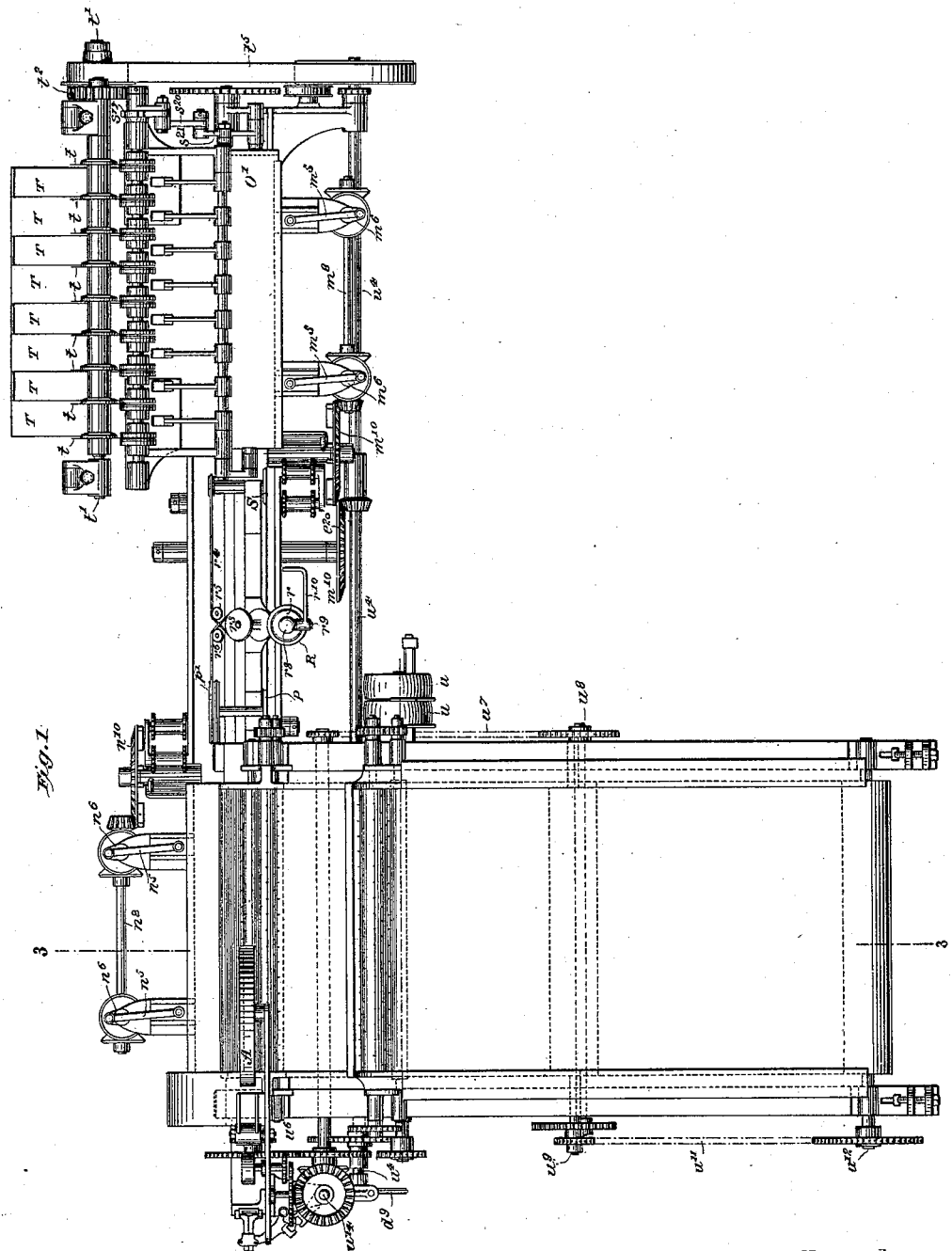

(No Model.) 14 Sheets—Sheet 1.

J. A. BONSACK.
CIGARETTE MACHINE.

No. 589,116. Patented Aug. 31, 1897.

Witnesses:
Raphael Netter
Robt. H. Duncan

Inventor
James A. Bonsack (No Model.)
J. A. BONSACK.
CIGARETTE MACHINE.
No. 589,116.  14 Sheets—Sheet 2.
Patented Aug. 31, 1897.
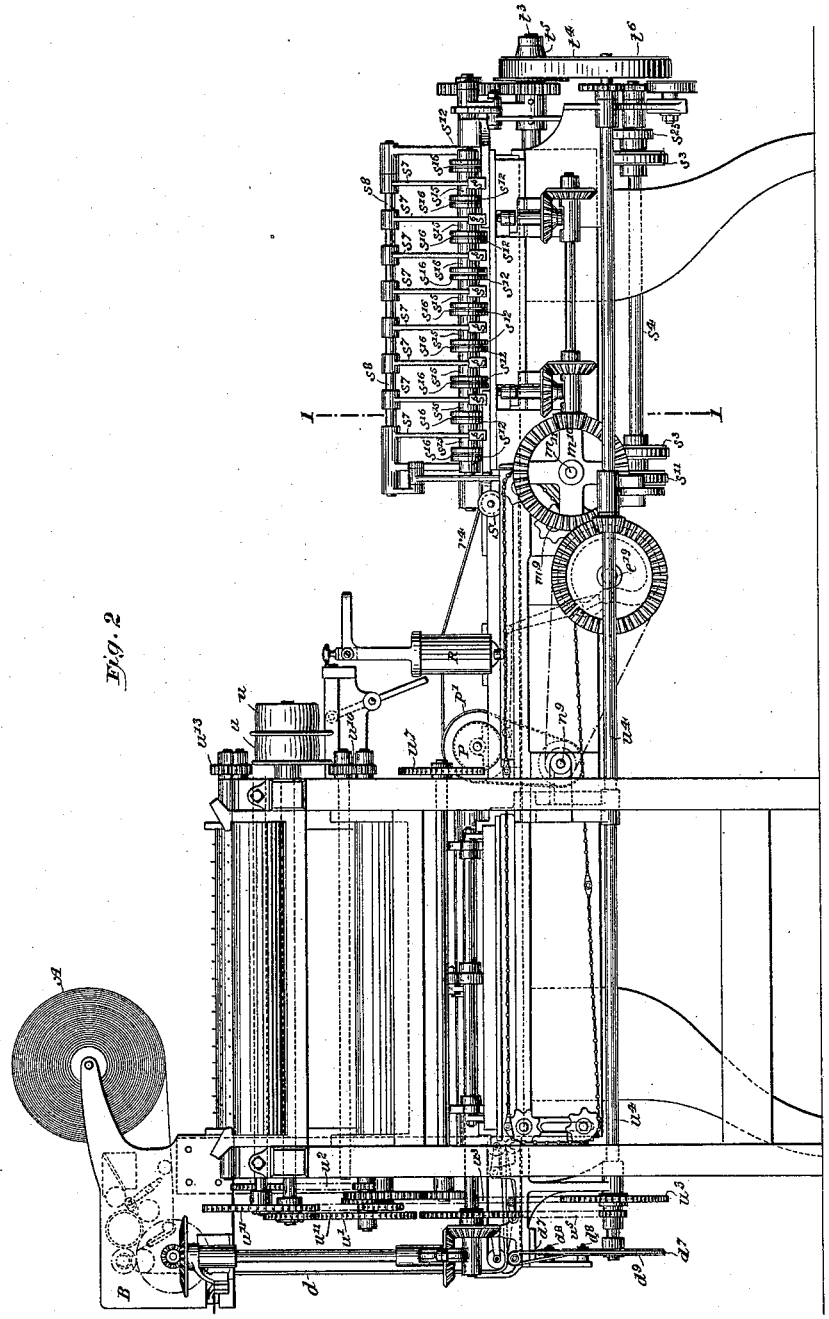
Witnesses:
Raphael Netter
Robt. H. Duncan
Inventor
James A. Bonsack

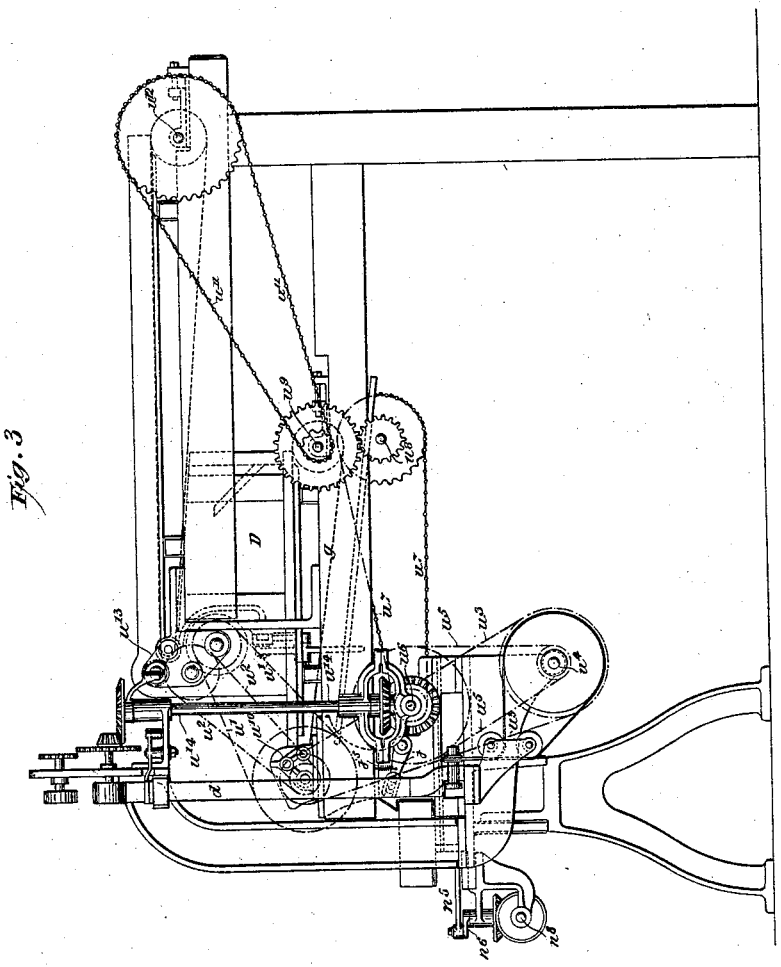

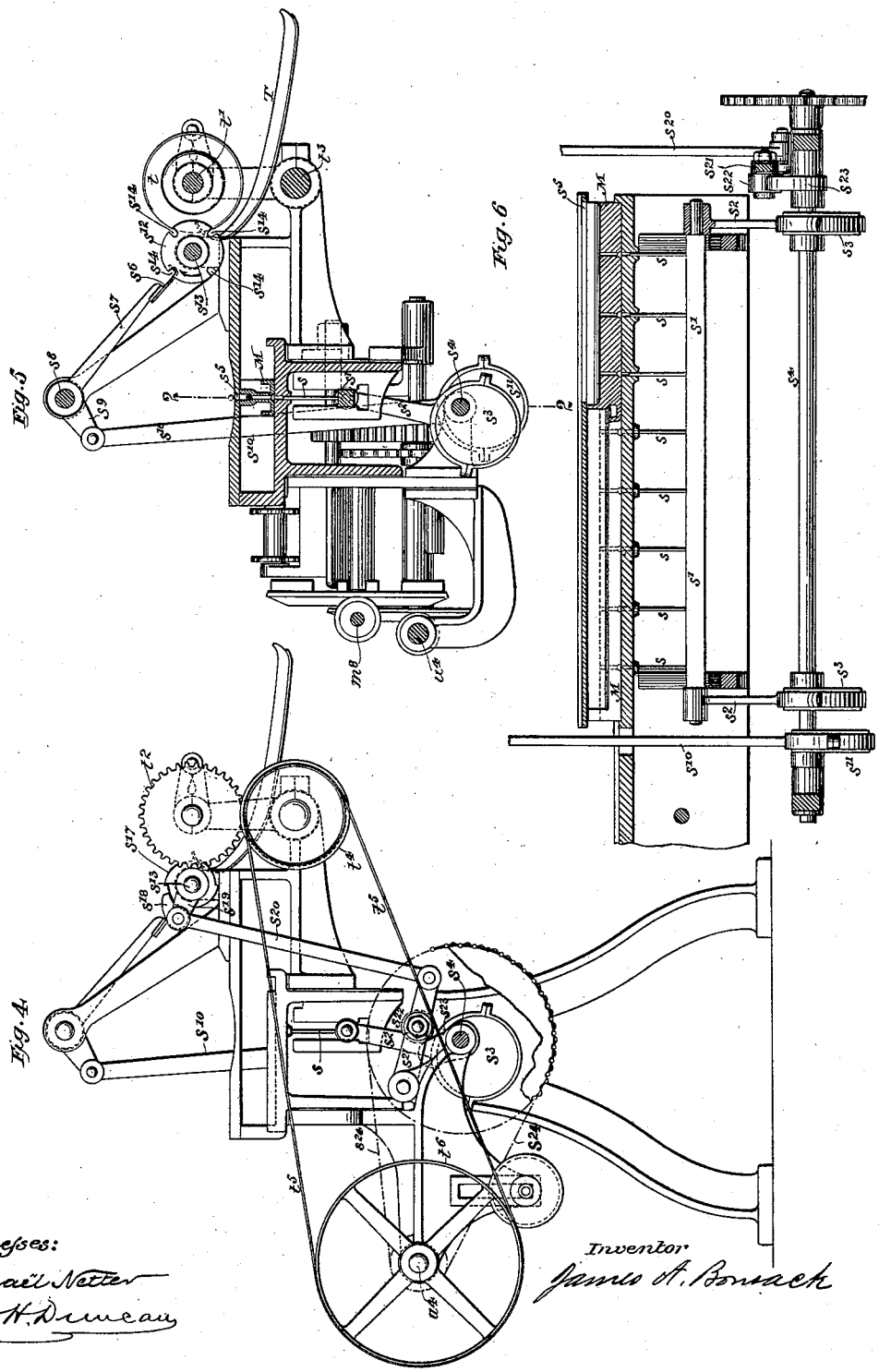

(No Model.) 14 Sheets—Sheet 5.
J. A. BONSACK.
CIGARETTE MACHINE.
No. 589,116. Patented Aug. 31, 1897.
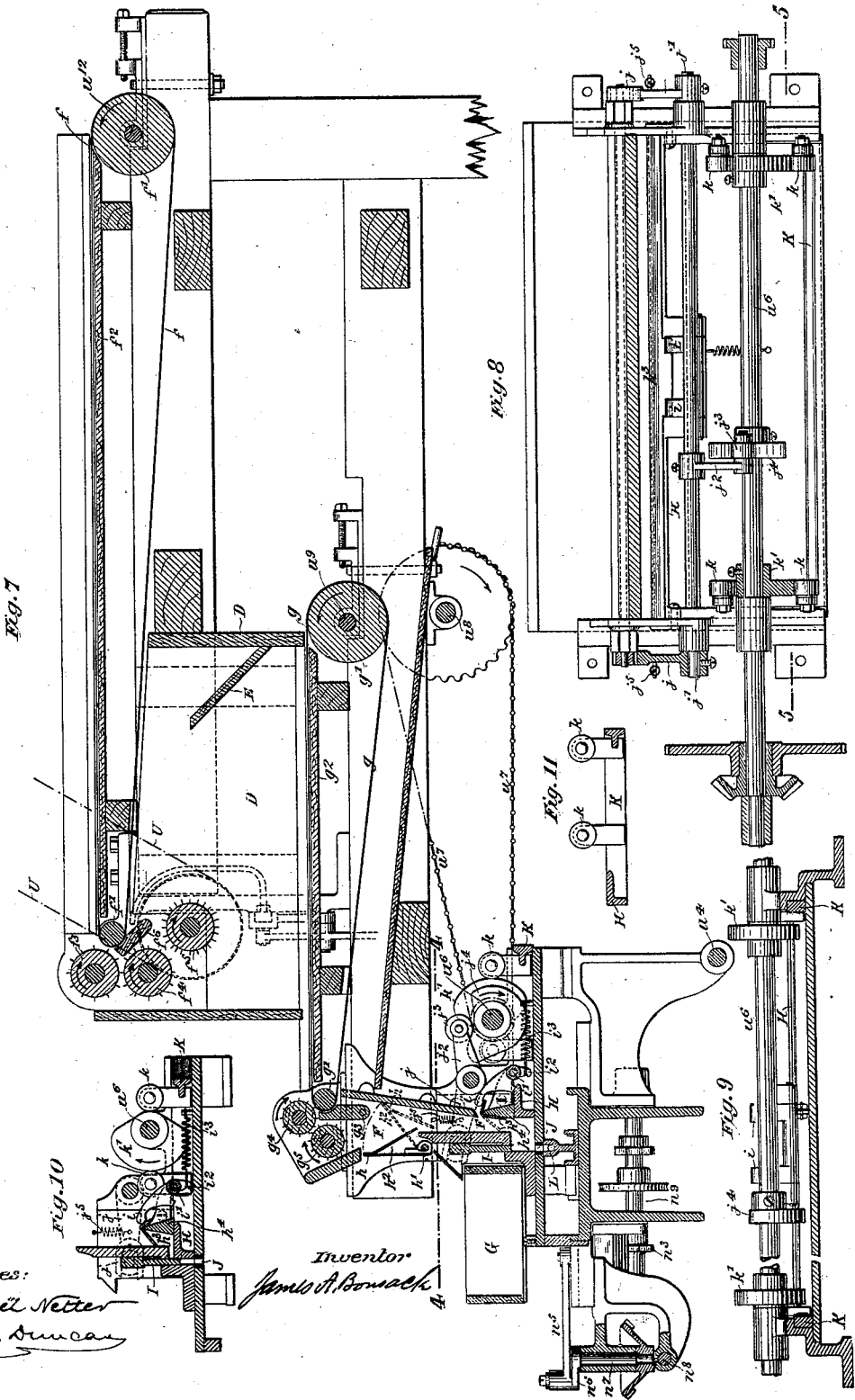
Witnesses:
Raphaël Netter
Robt H. Duncan
Inventor
James A. Bonsack

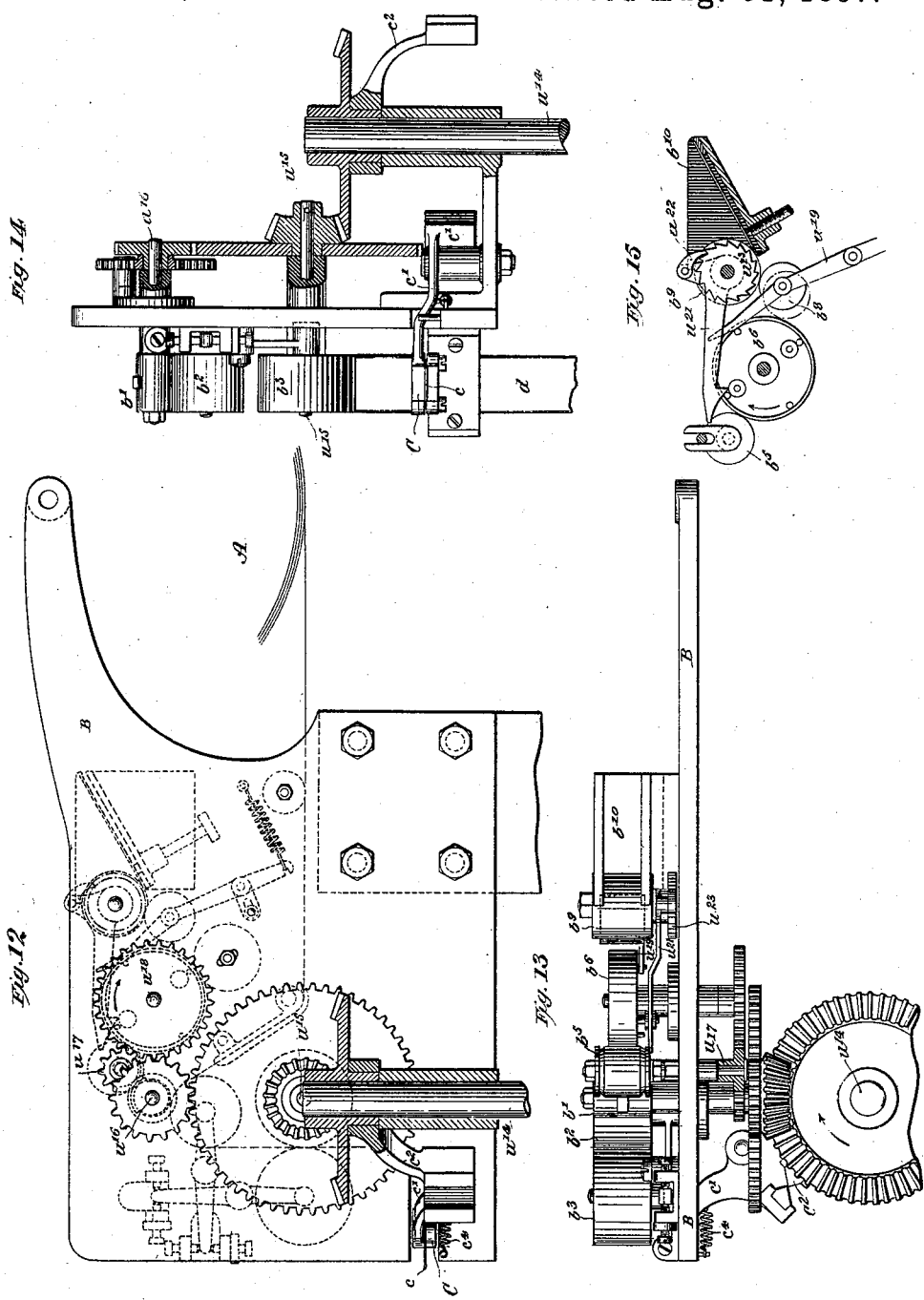

(No Model.)
14 Sheets—Sheet 7.
J. A. BONSACK.
CIGARETTE MACHINE.
No. 589,116.
Patented Aug. 31, 1897.
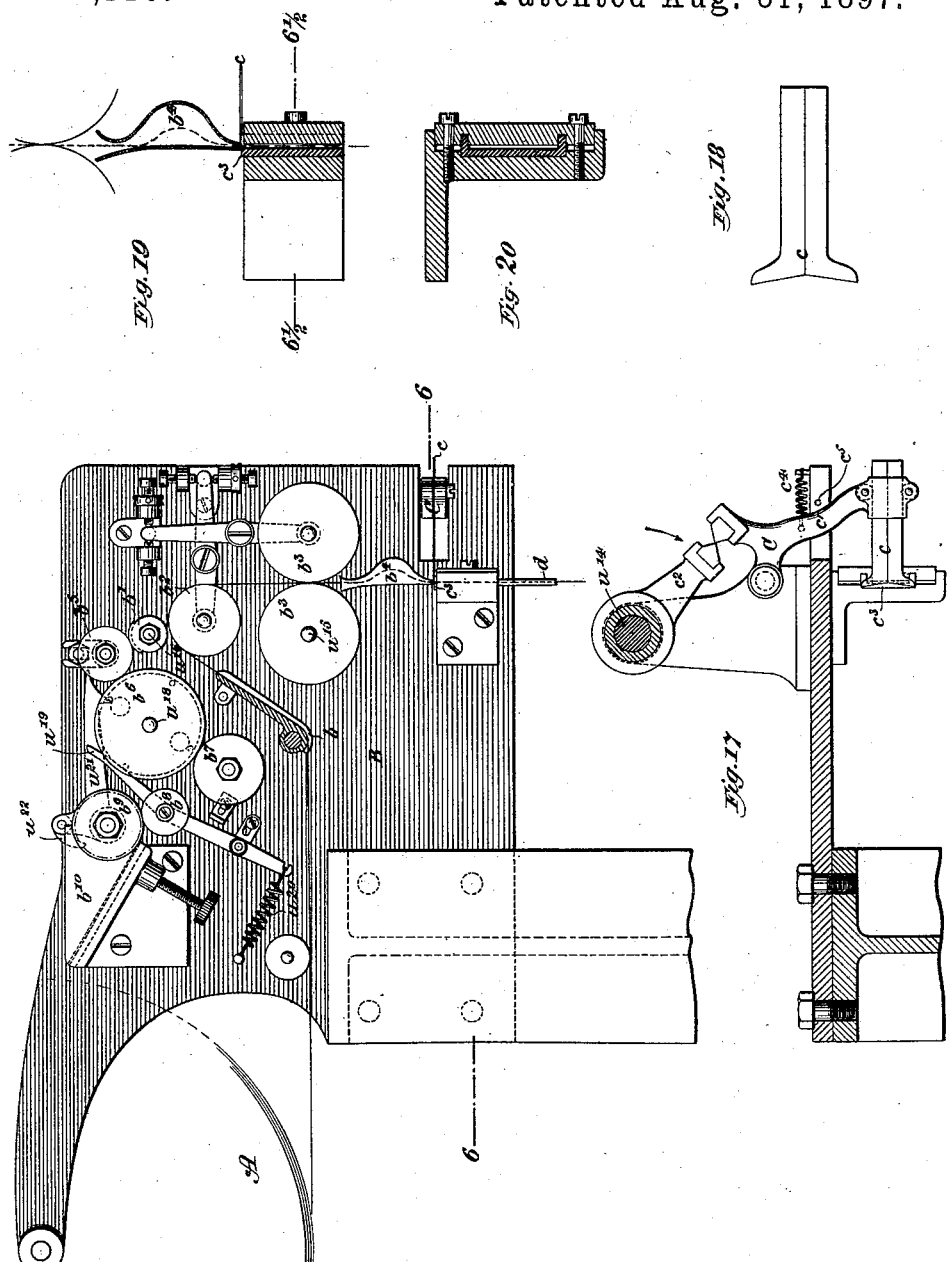
Witnesses:
Raphaël Netter
Robt. H. Duncan
Inventor
James A. Bonsack

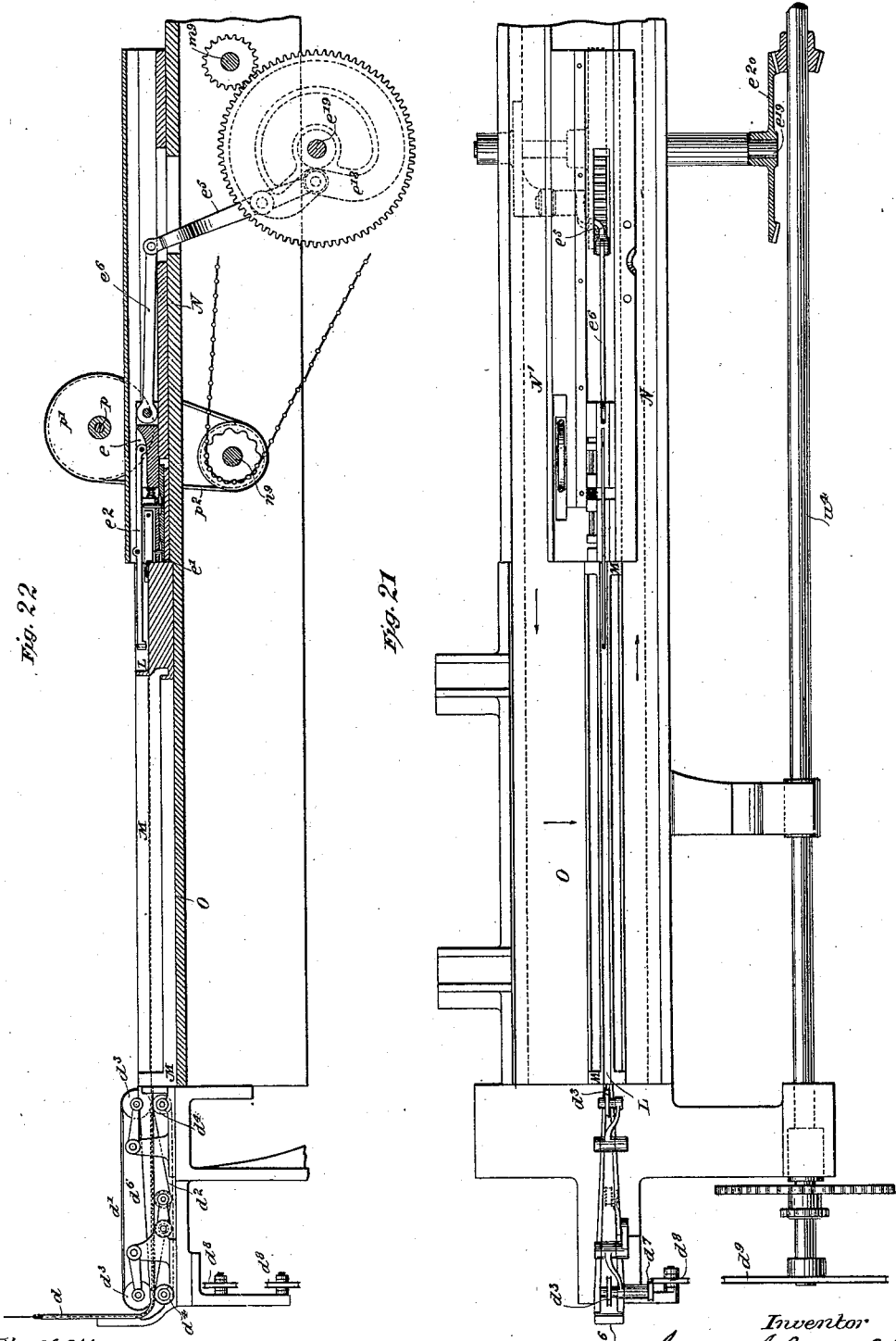

(No Model.) 14 Sheets—Sheet 9.
J. A. BONSACK.
CIGARETTE MACHINE.
No. 589,116. Patented Aug. 31, 1897.
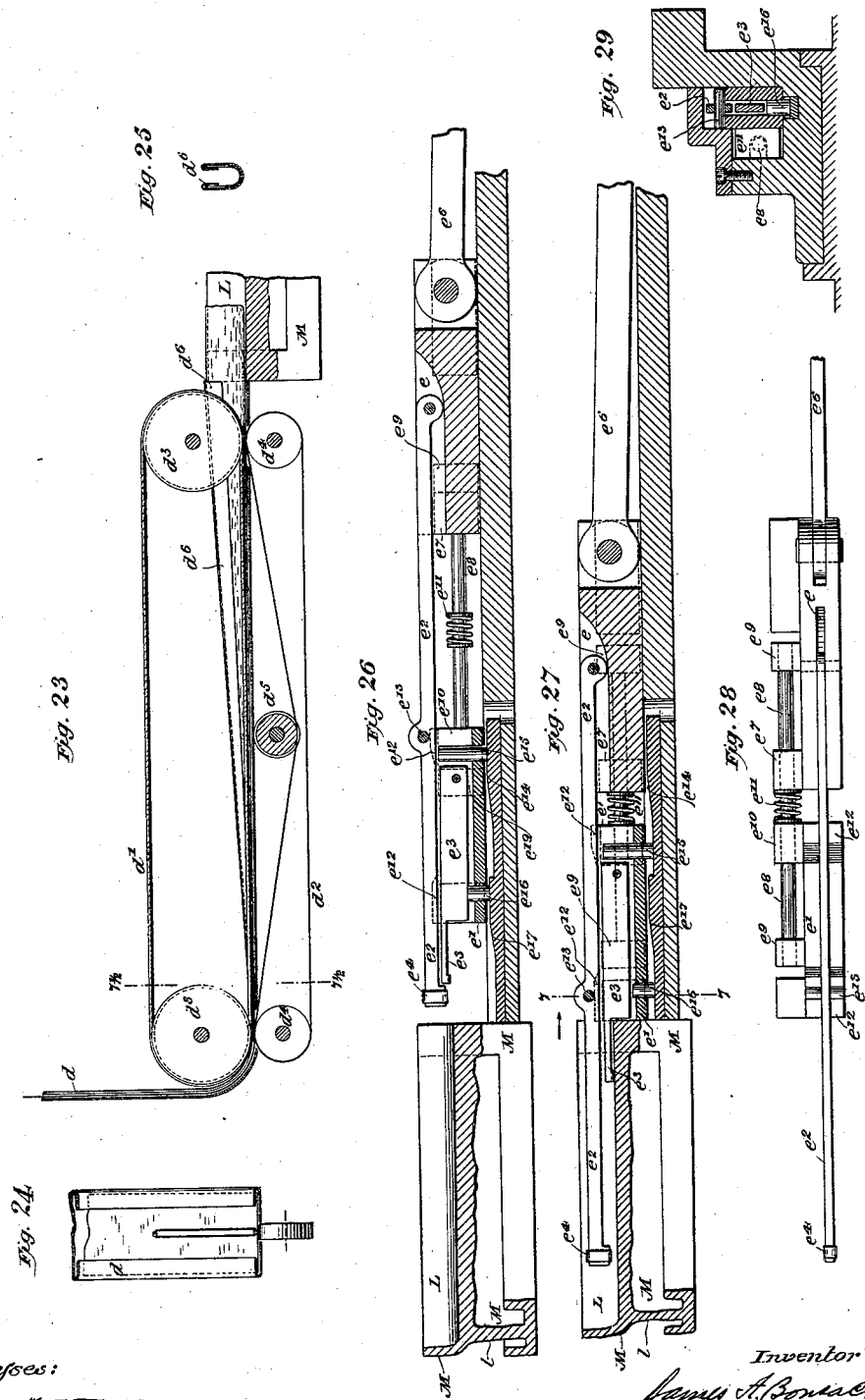
Witnesses:
Raphael Netter
Robt. H. Duncan
Inventor
James A. Bonsack (No Model.) 14 Sheets—Sheet 10.
J. A. BONSACK.
CIGARETTE MACHINE.
No. 589,116. Patented Aug. 31, 1897.
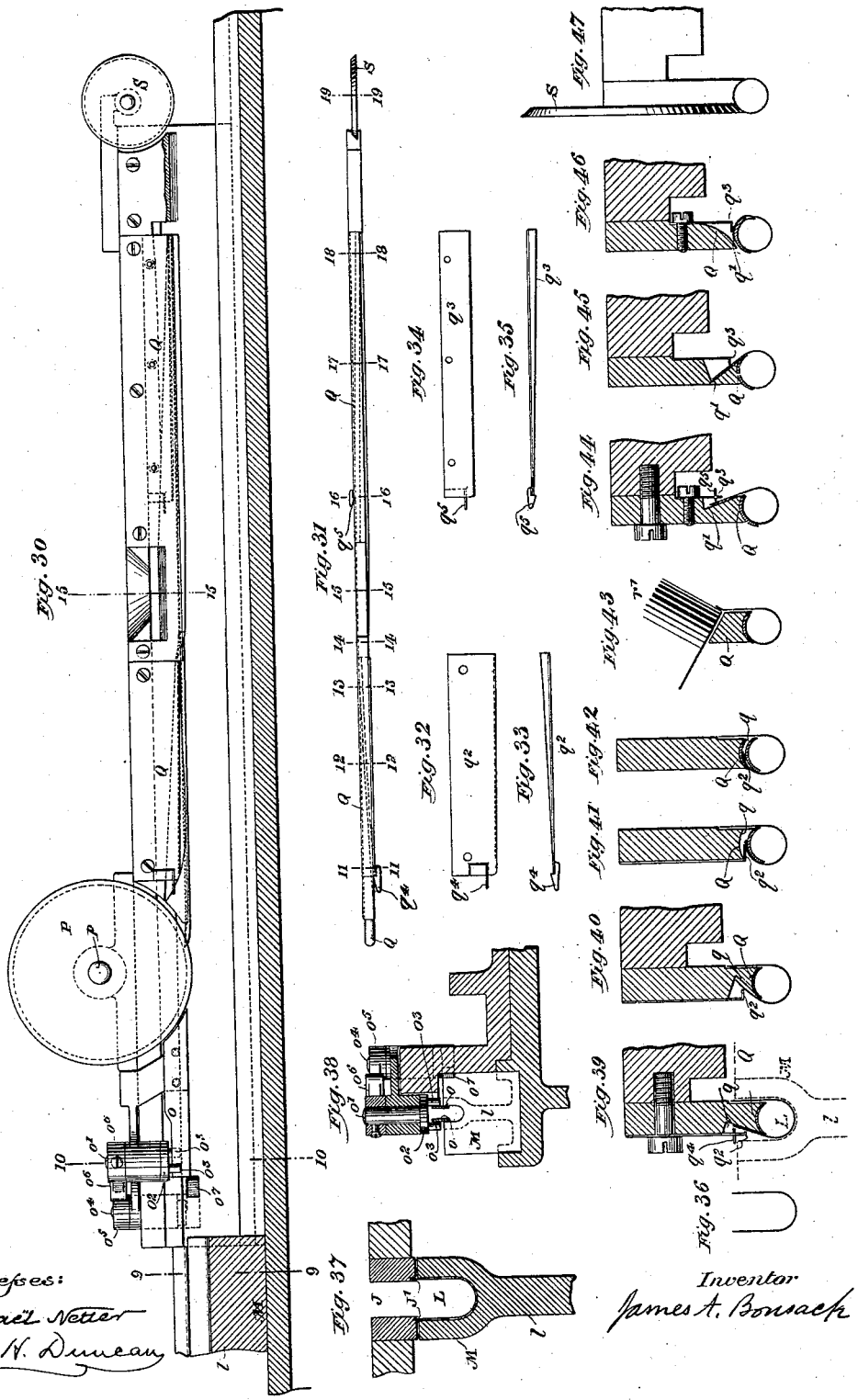
Witnesses:
Raphaël Netter
Robt. N. Duncan
Inventor
James A. Bonsack (No Model.)  14 Sheets—Sheet 11.
J. A. BONSACK.
CIGARETTE MACHINE.
No. 589,116.  Patented Aug. 31, 1897.
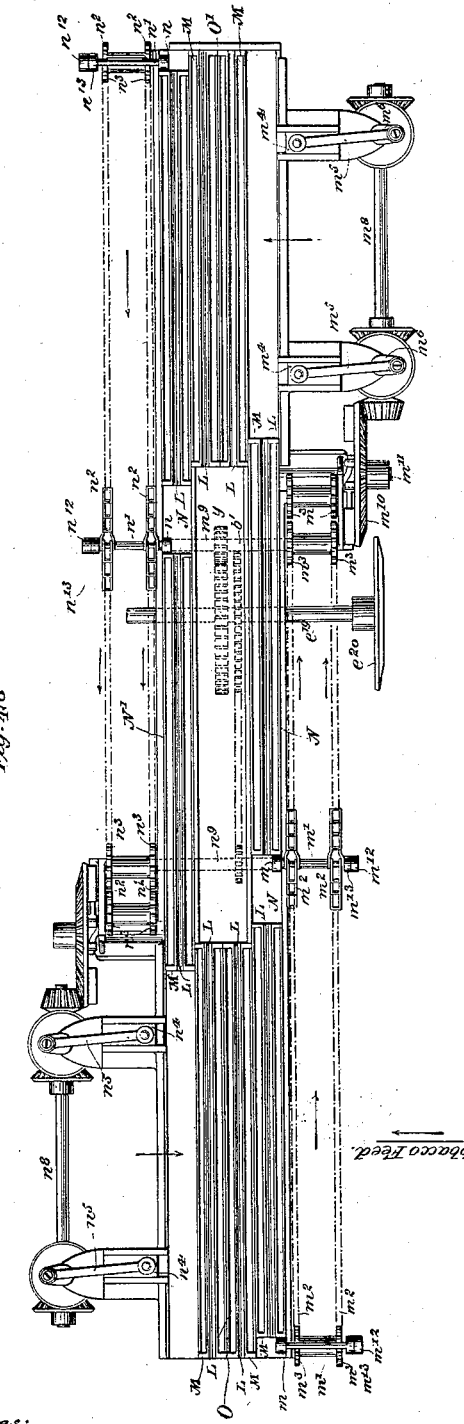
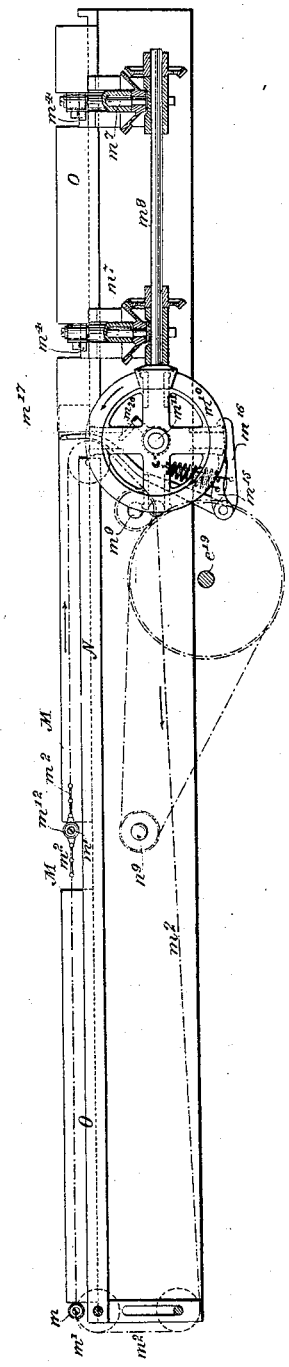
Witnesses:  Inventor
Raphael Netter  James A. Bonsack
Rob't H. Duncan

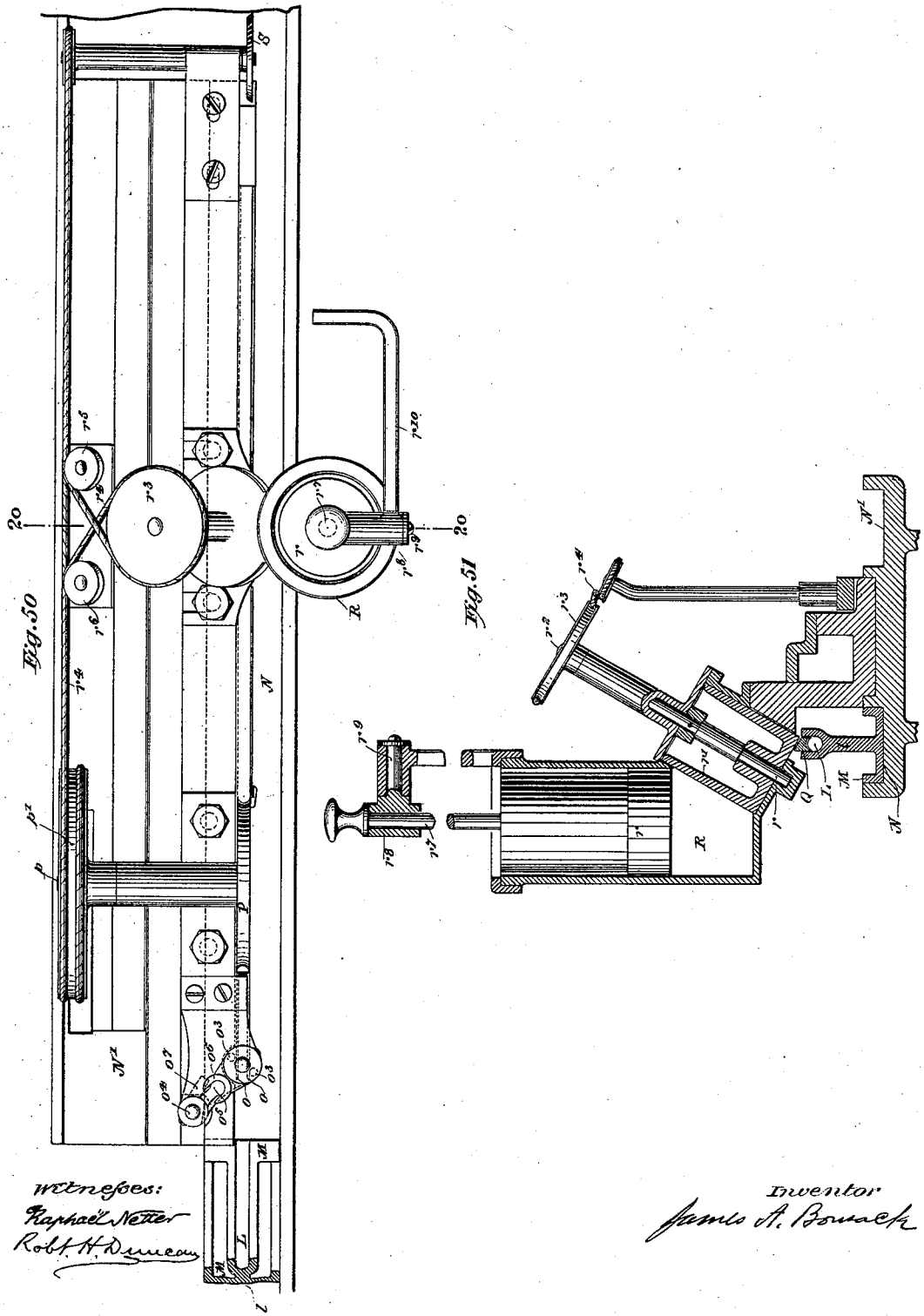

(No Model.)  14 Sheets—Sheet 13.
J. A. BONSACK.
CIGARETTE MACHINE.
No. 589,116.  Patented Aug. 31, 1897.
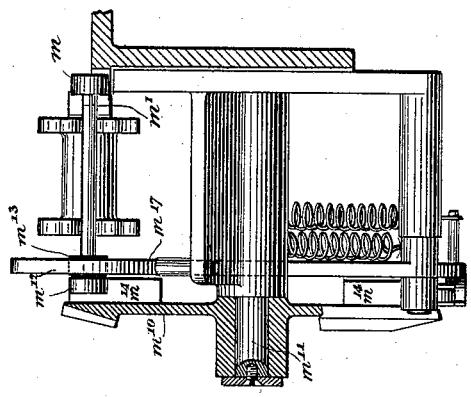
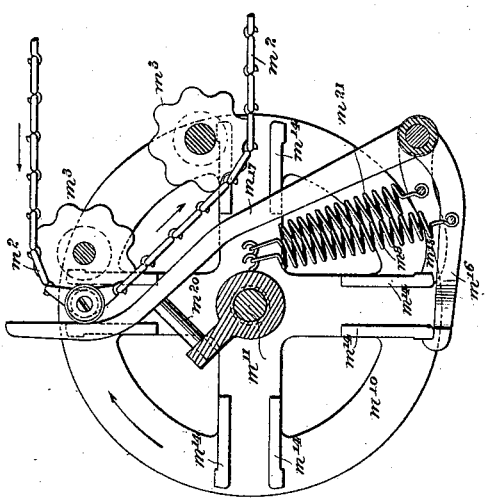
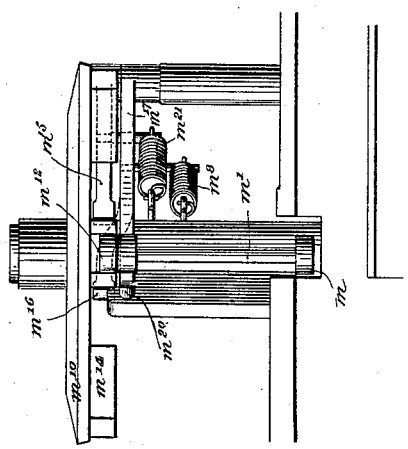
Witnesses:  Inventor
Raphael Netter  James A. Bonsack
Robt. H. Duncan

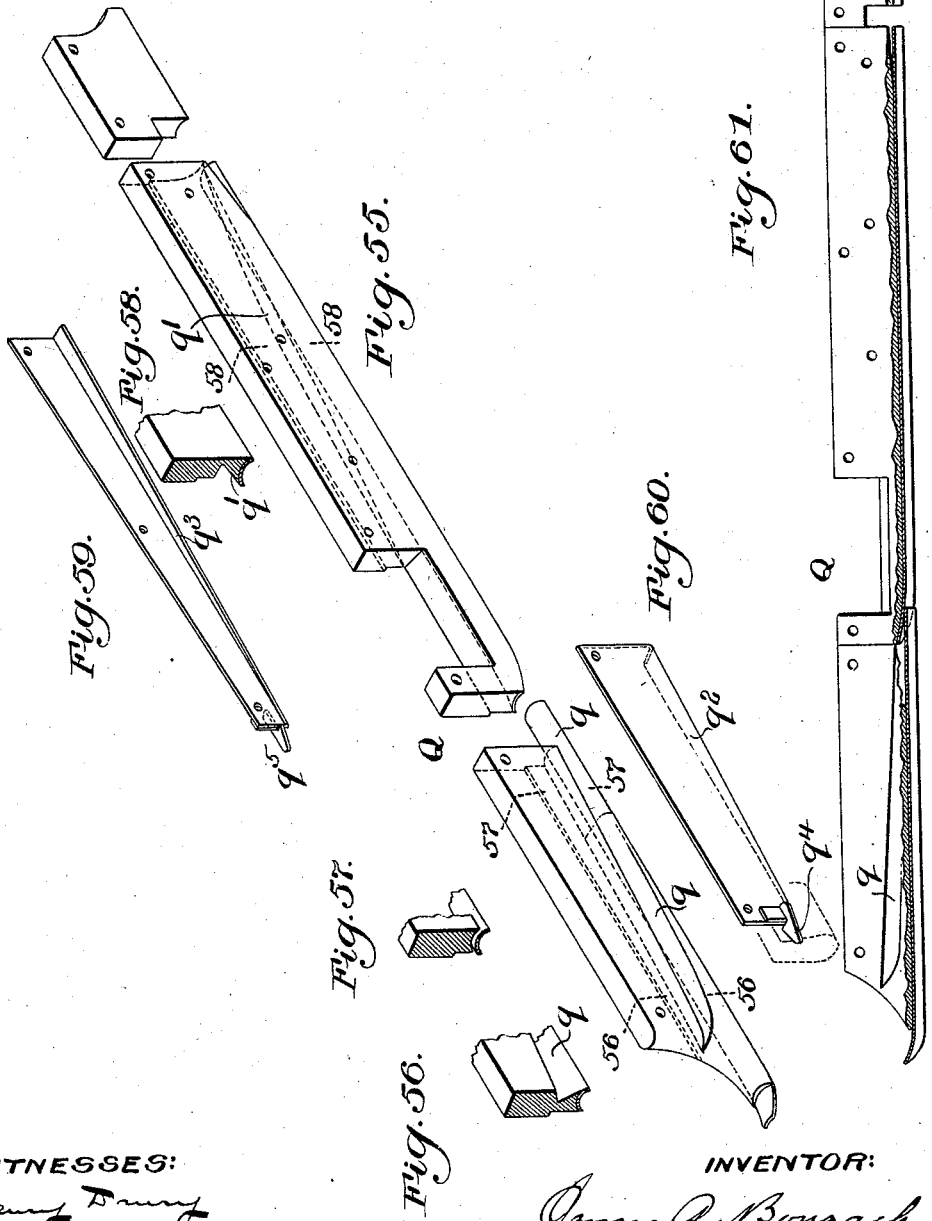

UNITED STATES PATENT OFFICE.

JAMES A. BONSACK, OF PHILADELPHIA, PENNSYLVANIA, ASSIGNOR TO THE BONSACK MACHINE COMPANY, OF SALEM, VIRGINIA.

CIGARETTE-MACHINE.

SPECIFICATION forming part of Letters Patent No. 589,116, dated August 31, 1897.

Application filed August 30, 1890. Serial No. 363,536. (No model.)

*To all whom it may concern:*

Be it known that I, JAMES A. BONSACK, of Philadelphia, in the county of Philadelphia and State of Pennsylvania, have invented new and useful Improvements in Cigarette-Machines, of which the following is a specification.

This invention relates to a cigarette-machine by whose operation a cigarette rod or blank is made and is afterward cut into suitable lengths.

The several operations of this machine and the sets of mechanisms by which these operations are worked out or performed are as follows: Feeding paper wrappers to a printing mechanism and printing the same; feeding the printed wrappers to a device which severs them into suitable lengths for the filler-forming molds; feeding the severed wrapper lengths to and adjusting them in the cigarette-molds; distributing and feeding the desired quantity of tobacco and placing the same upon the wrappers in the molds; moving the cigarette-molds to bring them beneath the mouth of the tobacco-feed and to register with the wrapper-feed and cutter delivering mechanism; folding the free edges of the wrapper around the tobacco fillers, paste being applied to one of the wrapper edges and folding it to overlap the other edge and sealing it in place; discharging the cigarette-rods from their molds, delivering them to a cutting mechanism, and cutting them into suitable lengths.

The invention is illustrated in the accompanying drawings, in which—

Figure 1 is a plan view of the machine. Fig. 2 is a side elevation of the same; Fig. 3, an end elevation as seen from the left of Figs. 1 and 2. Fig. 4 is an end elevation as seen from the right of Figs. 1 and 2. Fig. 5 is a vertical sectional view on line 1 1 of Fig. 2. Fig. 6 is a longitudinal sectional view on line 2 2 of Fig. 5. Fig. 7 is a sectional view of the tobacco-feeding mechanism on the line 3 3 of Fig. 1. Fig. 8 is a plan section on line 4 4 of Fig. 7, with one side of the hopper omitted. Fig. 9 is a sectional view on line 5 5 of Fig. 8. Fig. 10 is a detail view of the tobacco gathering and compressing mechanism, showing the cams which operate such mechanism in the opposite position from that shown for the same parts in Fig. 7. Fig. 11 is a sectional view of the gathering and compressing frame with the rollers on which the cam works. Fig. 12 is an enlarged view of the printing mechanism shown in Fig. 1, with a portion of the driving mechanism broken away. Fig. 13 is a plan view of the printing mechanism. Fig. 14 is an end elevation of the printing mechanism as seen from the left of Figs. 12 and 13, with a portion of the driving mechanism broken away. Fig. 15 is a detail view of the inking device of the printing mechanism. Fig. 16 is a side elevation of the printing mechanism as seen from the opposite side of Fig. 12. Fig. 17 is a detail sectional view of the wrapper-cutting mechanism on line 6 6 of Fig. 16. Fig. 18 is a detail view of the cutting-knife. Fig. 19 is a vertical section of the wrapper-guide. Fig. 20 is a cross-section of the wrapper-guide on line 6½ 6½ of Fig. 19. Fig. 21 is a plan view showing the wrapper feeding and adjusting mechanism. Fig. 22 is a section of the same with a portion broken away. Fig. 23 is a side elevation of the wrapper-feeding mechanism. Fig. 24 is a sectional view on the line 7½ 7½ of Fig. 23, as seen from the right. Fig. 25 is an end view of the wrapper-guide, as seen from the right of Fig. 23. Figs. 26 and 27 are detail sectional views showing the wrapper-adjusting mechanisms in their extreme positions. Fig. 28 is a plan view of the wrapper-adjusting mechanism, as seen in the position shown in Fig. 27. Fig. 29 is a cross-section on line 7 7 of Fig. 27. Fig. 30 is a side elevation of the compressing-wheel, wrapper-folding mechanism, and smoothing-wheel, the pasting device being omitted. Fig. 31 is a plan view of that portion of the wrapper-folding mechanism and smoothing-wheel seen on the right of line 8 8 of Fig. 30. Figs. 32, 33, 34, and 35 are side elevations and plan views of the wrapper-folders. Fig. 36 is a view of the U-shaped wrapper, as seen in Fig. 37. Figs. 37, 38, 39, 40, 41, 42, 43, 44, 45, 46, and 47 are sectional views on the respective lines 9 9, 10 10, 11 11, 12 12, 13 13, 14 14, 15 15, 16 16, 17 17, 18 18, and 19 19 of Figs. 30 and 31. Fig. 48 is a plan view showing a series of cigarette-molds and the mechanism for moving them from one registering position to another. Fig. 49 is a side elevation of that portion of the machine shown in Fig. 48 with a part of the driving mechanism shown in section. Fig. 50 is a plan view of the mechanism shown in Fig. 30 with the pasting device added. Fig. 51 is a sectional view on line 20 20 of Fig. 50, and Figs. 52, 53, and 54 are detail views of portions of the mechanisms which move the cigarette-molds. Fig. 55 is a perspective view, on an enlarged scale, of the wrapper-folding mechanism, of which a side view is shown in Fig. 30. Figs. 56, 57, and 58 are fragmentary perspective views on the lines 56 56, 57 57, and 58 58, respectively, of Fig. 55. Fig. 59 is a perspective view of the presser edge which is shown in side view in Fig. 32. Fig. 60 is a perspective view of the presser edge shown in side view in Fig. 34; and Fig. 61 is an elevation of the former or folder shown in Fig. 55, showing the parts of which it is composed secured together.

Referring to the drawings the mechanism for printing the paper wrappers, cutting them into suitable lengths, and feeding them to the cigarette-molds will be first described as follows:

The paper is preferably a continuous strip A, wound upon a reel which is mounted in a suitable bearing attached to the frame of the machine, as shown in Fig. 2. The paper strip is of sufficient width to inclose the tobacco of the cigarette and give the desired overlap. The strip of paper as it is drawn from the reel passes into the printing mechanism B through a guide $b$ and between the type-wheel $b'$ and impression-wheel $b^2$, thence between feed-rolls $b^3$, thence into the guide $b^4$ to the cutting-off mechanism C, where it is severed into the desired lengths for the cigarette-molds. In the printing mechanism, as shown in Fig. 16, the ink is delivered to the type-wheel $b'$ by the wheel $b^5$, which in turn receives it from the wheels $b^6$, $b^7$, $b^8$, and $b^9$, the latter of which takes it from the reservoir $b^{10}$. The wheels $b'$ and $b^5$ are constructed and arranged to print continuously, if so desired, upon the paper strip, and in this respect they differ from the segmental construction shown in prior patents, which was designed and adapted to operate only intermittently.

The wrapper-cutting mechanism C consists of the knife $c$, pivoted lever $c'$, revolving arm $c^2$, and shearing-anvil $c^3$. The line of the cutting edge of the knife is concave or reëntrant, so that as it strikes the paper it will operate to cut the edges of the paper first, the tendency of this being, as the paper is fed continuously, to stop its progress the instant the blade touches it without displacing it and to cut it off at right angles to its edges and at the same time preserve a shearing action of the knife. As the advance of the paper strip is momentarily stopped by the operation of the knife while the feed continues, the guide $b^4$ is provided with a kind of loop-shaped enlargement back of the knife, into which the paper strip can back up or fold back, as shown in dotted lines in Figs. 16 and 19. The knife $c$ is operated in its forward movement by the contact of the free end of the rotating arm $c^2$ with the free end of the lever $c'$, to which the knife is attached. The necessary backward movement is given to the knife by a spring $c^4$, such movement being limited by a stop $c^5$.

The mechanism for feeding the wrapper-strips to the molds after they have been cut from the continuous strip or ribbon consists of a guide $d$, extending from the cutting-off knife to the feed-belts $d'$ and $d^2$, which are carried by wheels $d^3$ and $d^4$, the lower belt being deflected by the roller $d^5$ to keep it out of contact with the under side of the curved guide $d^6$, to be hereinafter described, and this belt passes through openings in the bottom of this guide opposite the wheels $d^4$, for the purpose of advancing the wrappers by frictional contact. The guide $d$ is curved at its lower end to direct the wrappers between the belts $d'$ and $d^2$. The guide $d^6$, which is substantially a continuation of the guide $d$, is gradually curved from a flat surface into a U shape, as shown in Fig. 25, its edges being folded over to form guides for the edges of the wrappers and is preferably located so as to register with the end of the mold when the latter is in position to receive the wrapper.

As the wrappers are cut from the continuous strip by the knife they drop by gravity down the guide $d$, and their forward ends are projected between the belts $d'$ and $d^2$, and the wrappers are advanced through the guide $d^6$ and gradually folded into the U shape, as seen in Fig. 25. As the wrappers emerge from the U-shaped end of the guide $d^6$ they are preferably fed successively into the end and along a U-shaped mold, to be hereinafter described, by the same means by which they are fed along the guide $d^6$, until the end of the strip has passed the line of the centers of the last pair of wheels $d^3$ and $d^4$.

The devices for still further feeding the wrappers into the mold and adjusting them therein consist of two slides $e$ and $e'$, to each of which is pivoted a lever $e^2$ and $e^3$. The lever $e^2$, which is preferably provided with a rubber band or head $e^4$, attached to its free end, serves by frictional contact to draw the paper forward into the desired position in the mold as the lever is moved backward by its connection with the slide $e$. The free end of the pivoted lever $e^3$ serves the purpose of a stop by means of which the wrapper is stopped or adjusted in the desired longitudinal position in the mold. This lever is moved into position in the mold and out again through its connection with the slide $e'$. Both the levers $e^2$ and $e^3$ are preferably moved downward by gravity, so that the former will rest upon the wrapper and the latter upon the bottom of the mold with a pressure in proportion to their respective weights. The slide $e$ is moved back and forth by a pivoted lever $e^5$ and connecting-rod $e^6$, and is provided at its forward end with a recessed lug $e^7$, through which passes a rod $e^8$, provided at each of its ends with squared heads $e^9$. The slide $e'$ is provided at its rear end with a recessed lug $e^{10}$, similar to the lug $e^7$, through which the rod $e^8$ also passes. The rod $e^8$ carries a spring $e^{11}$, which is placed between the lugs $e^7$ and $e^{10}$. The slide $e'$ is moved toward and preferably against the mold by the contact of the spring $e^{11}$ with the lug $e^{10}$ as the lug $e^7$ is carried forward with the slide $e$, and it is moved in the opposite direction by the contact of one of the heads $e^9$ against the lug $e^{10}$ when the rod $e^8$ is moved backward by the contact of the other head $e^9$ against the lug $e^7$ as the latter is drawn backward by the pivoted lever $e^5$. The free ends of the levers $e^2$ and $e^3$ are elevated and held in the elevated position by inclined planes or cams and pins working therein.

The lever $e^2$ is elevated and held in the elevated position during its movements toward and into the mold by the combined action of the inclined planes or cams $e^{12}$ $e^{12}$ with the pin $e^{13}$ and the inclined plane or cam $e^{14}$ with the pin $e^{15}$, from its position as shown in Fig. 27, and is allowed to drop so that the rubber band or head $e^4$ at the free end of lever $e^2$ will rest upon the wrapper, by the pin $e^{13}$ sliding down the inclined plane or cam $e^{12}$ at the forward end of the slide $e'$, as the lever $e^2$ and slide $e$ start backward, while the slide $e'$, with its inclined planes or cams, remains stationary, and the free end of lever $e^2$ remains down and in contact with the wrapper until it is elevated or raised therefrom by the pin $e^{13}$ riding up on the inclined plane or cam $e^{12}$ at the rear end of slide $e'$, and when the pin $e^{13}$ has reached the top of this latter plane or cam the slide $e'$ is caused to be moved backward with the lever $e^2$ by reason of the connection between the two slides $e$ and $e'$, heretofore explained, until the lever $e^2$ and the slides have reached their limit of movement in that direction, as shown in Fig. 26. As the slide $e'$ moves backward the end of the pin $e^{15}$ rides up the inclined plane or cam $e^{14}$ on the bed of the machine and is moved upward, so that its upper end will be almost in contact with the under surface of the lever $e^2$, as shown in Fig. 26. The lever $e^2$ in its forward movement toward and into the mold is prevented from dropping down as the pin $e^{13}$ moves off from the inclined plane or cam $e^{12}$, where it rests, as shown in Fig. 26, by the under side of the lever $e^2$ coming in contact with the upper end of the pin $e^{15}$, and by reason of such contact is held or kept in the raised or elevated position until the pin $e^{13}$ has passed over the space between the cams or inclined planes $e^{12}$ $e^{12}$ and has passed over the top of the plane or cam $e^{12}$ at the front of the slide $e'$. About this time the slide $e'$ is caused to begin its forward movement by reason of the spring $e^{11}$ and lug $e^7$ coming in contact with the lug $e^{10}$ on slide $e'$, and as the two slides $e$ and $e'$ continue their forward movement together the pin $e^{15}$ rides down and off the inclined plane or cam $e^{14}$ on the bed of the machine and into the position shown in Fig. 27, where its upper end will be a sufficient distance away from the under side of lever $e^2$, so as to allow such lever to drop down the required distance when the pin $e^{13}$ rides down and off the inclined plane or cam $e^{12}$, where it rests, as shown in Fig. 27, and remains down until the pin $e^{13}$ reaches the inclined plane or cam $e^{12}$ at the other end of slide $e'$, when it is again raised or elevated, as before explained. The lever $e^3$, pivoted to the slide $e'$, is moved toward and into and out of and away from the mold as the slide $e'$ moves back and forth, as heretofore explained. In order to prevent the free end of the lever $e^3$ striking against the end of the mold as it enters it, its free end is elevated during the first part of its forward movement and the latter part of its backward movement by the pin $e^{16}$ riding up the inclined plane or cam $e^{17}$ on the bed of the machine, this plane or cam being located at such distance from the end of the mold that the end of the lever $e^3$ will have entered the mold before it commences its downward movement. The lever $e^2$ and the lever or stop $e^3$ act conjointly to adjust the paper in the mold as follows:

When the leyer $e^2$ has made its extreme advance into the mold, the lever $e^3$ is in position on the bottom of the mold to act as a stop, as seen in Fig. 29, and the lever $e^2$ then begins its backward movement and drops down upon the surface of the wrapper. As its backward movement continues it draws the wrapper along by frictional contact till the end of the wrapper strikes against the stop on the end of lever $e^3$, which prevents the further progress of the wrapper and causes the free end or head of lever $e^2$ to slide over the surface of the wrapper until it is raised therefrom.

Having described the mechanism by which the wrappers are fed, printed, cut into suitable lengths, and further fed to and adjusted in the U-shaped molds, the mechanism by which the tobacco is fed and introduced into the wrappers in the molds will now be described.

Tobacco suitably prepared is distributed in measured or regulated quantities upon an endless apron or belt $f$, passing over rolls $f'$ and over a table or support $f^2$. At the forward end of this belt and in front of the same are located a feed-roll $f^3$ and a picker-roll $f^4$, while preferably below, slightly backward of, and out of contact with the picker-roll $f^4$ is located a scattering-roll $f^5$, arranged to operate independently of the picker-roll $f^4$, all of these rolls being arranged to revolve in the same direction, the roll $f^3$ revolving at about the speed of the movement of the belt and the roll $f^4$ revolving at a much greater speed than the roll $f^3$, while the roll $f^5$ revolves considerably faster than the roll $f^4$. Preferably between the rolls $f'$ and $f^4$ is a block $f^6$, which prevents the tobacco from following the belt upon its return. The object of the roll $f^3$ is, in conjunction with the belt $f$, to feed the tobacco upon the picker-roll $f^4$, which by its rapid rotation separates its fibers and delivers it to roll $f^5$, which in turn still further separates and distributes the tobacco by throwing it away from its surface and scattering it upon a second apron or belt $g$ in a comparatively light and uniform layer. The scattering-roll $f^5$ is arranged to operate independently of the mechanism which feeds or delivers the tobacco to this roll, in order that it may be run at the desired speed to scatter the tobacco sufficiently to deposit it upon the receiving-belt in a uniform layer of the desired width for the length of the cigarette-fillers to be formed. This apron or belt $g$ runs at right angles to the axis of the scattering-roll $f^5$ and forms the bottom of a receptacle D, to the rear wall of which is attached a shelf E, projecting upward into the receptacle, and into which nails, stones, and other heavy foreign substances, which are sometimes found in the tobacco, may be thrown by the increased momentum given them by their greater weight by the rotation of the roll $f^5$, and thus be separated from the tobacco.

The belt $g$ is carried on the rollers $g'$ and is supported by the bed or table $g^2$, and at its forward end is a block $g^3$, to prevent the tobacco from following the belt on its return movement, and a feed-roll $g^4$ and picker-roll $g^5$. The speed of the belt $g$ is preferably about four times that of the belt $f$ and the speed of the feed-roll $g^4$ is about the same as that of the belt $g$, while that of the picker-roll $g^5$ is much greater than that of the roll $g^4$. By locating the picker-rolls $f^4$ and $g^5$ in proper and near relation to the front ends of their respective feed-belts the blocks $f^6$ and $g^3$ can be dispensed with. The operation and effect of picker-roll $g^5$ are substantially the same as that of the picker-roll $f^4$, and it delivers the picked and separated tobacco into a hopper or receptacle F, located beneath it.

The front side $h$ of the hopper F is shaped like an inverted V and is hinged at $h'$, so that it can be swung backward to close the lower portion thereof and form an incline $h^2$, upon which the tobacco is deposited when starting the machine and before the regulated quantities of tobacco can be delivered to the bottom of hopper F, and the tobacco is conveyed or falls by gravity into a receptacle G. This position of side $h$ of the hopper is indicated in Fig. 7 by dotted lines. When the machine is in regular operation, the hopper is in the position shown in full lines and the tobacco falls from the picker-roll $g^5$ upon a movable bottom $h^3$ (shown in full lines in Fig. 10 and in dotted lines in Fig. 7) in position to receive the tobacco and is retained in such position while the gatherer and compressor H is in its forward position, as hereinafter described. This bottom is of angular shape in cross-section, as shown in Figs. 7 and 10, and is supported and works upon the top of the bar $h^4$, which forms a part of the rear wall of the hopper, and is operated to be closed by the contact of arms $i$ with it, which arms are attached to rock-shaft $i'$ and have inclined faces near the rock-shaft so arranged to come in contact with correspondingly-inclined faces on the rear edge of the gatherer and compressor H that as the compressor is moved backward the inclined faces will meet and those upon the arms $i$ will ride upon those on the compressor H and raise the arms $i$, allowing the movable bottom $h^3$ to drop by its own weight into the position shown in Fig. 7. The arms $i$ are provided with extensions $i^2$, to which a spring $i^3$ is attached, the other end being secured to the frame of the machine. This spring moves the arms $i$ downward and against that portion of the bottom $h^3$ which extends through the hopper F and causes the bottom to rock upon the edge of the bar $h^4$, which supports it, thus moving the bottom into the closed position shown in Fig. 10.

From the above description and reference to the drawings it will be seen that the hopper-bottom $h^3$ is moved into position to close the hopper at certain predetermined times and is retained in the closed position until the tobacco, which is fed upon the closed bottom in an uninterrupted and uniform stream, has been collected upon such bottom in sufficient quantity to form a cigarette-filler of the desired size, when the devices which hold the movable bottom in its closed position are withdrawn and the bottom opens by gravity and the tobacco for the filler falls upon the receiving-surface located beneath the hopper. By this construction and arrangement it is practicable to feed a constant or uninterrupted stream of tobacco directly upon a movable bottom of a hopper or receptacle and measure out or definitely determine the quantity of tobacco for a cigarette-filler of the desired length and size.

When the quantity of tobacco for a filler has been dropped from the hopper upon the receiving-surface beneath, it is gathered and compressed by the sliding gatherer and compressor H and is brought under the plunger I and over the channel J. The gatherer and compressor H forms one side of an oblong frame K, (shown in cross-section in Fig. 11,) which slides in suitable ways arranged on the bed of the machine, and is provided at each of its ends with rollers $k$, between which the cams $k'$ operate to move the frame K back and forth in its ways, these cams and the sliding frame being shown in their extreme rearward position in Fig. 7 and in their extreme forward position in Fig. 10. The plunger I is moved in suitable ways to force the tobacco through the channel J and into the U-shaped mold L, located beneath it, (into which a wrapper has been introduced, as heretofore described,) by arms $j$, operated by rock-shaft $j'$ and connected at their forked ends with pivoted sliding blocks attached to the ends of the plunger I. The rock-shaft $j'$ is provided with an arm $j^2$, having at its free end a roller $j^3$, working upon a cam $j^4$ on the same shaft with the cams $k'$, heretofore described, springs $j^5$ being attached to arms of the rock-shaft $j'$, so as to hold the roller $j^3$ in contact with the cam $j^4$, as shown in Figs. 3 and 8. The lower edge of the plunger I is preferably semicylindrical and moves downward sufficiently to compress the tobacco into a cylindrical filler in the mold, where it is partially surrounded by the wrapper previously introduced. The width of the channel J and the thickness of the plunger I, which works therein, are preferably somewhat less than the width of the upper portion of the U-shaped mold L, so that when the tobacco is forced down into the wrapper in the mold the liability of crumpling or wrinkling the wrapper will be avoided.

Guiding grooves or recesses J' are arranged between the channel J and mold L, as shown in Fig. 37, when the latter are in registering position with the former, and one wall of each groove or recess extends below and between the side edges of the wrapper when it is in the mold. These guiding grooves or recesses J' receive and guide the side edges of the wrapper as the wrapper moves into and along the mold, and the wall of each groove or recess which extends below and between the edges of the wrapper forms a continuation of the channel and protects these edges and largely decreases the liability of such edges becoming wrinkled or crumpled as the tobacco is fed to the wrapper through the channel. These grooves or recesses J' are shown in the drawings as being constructed in the lower part of the walls of the channel J, and this arrangement may be said to be the preferred one; but other ways of constructing these grooves or recesses will suggest themselves to those skilled in this art. If only the wall of each groove or recess which extends below and between the side edges of the wrapper and the channel be employed, then the protecting action of such grooves or recesses will be accomplished.

The mold L is a U-shaped groove formed in suitable material, whose transverse interior wall is preferably less than the width of the wrapper which it is to receive, and is also preferably slightly longer than the length of the wrappers used and the cigarette rods or blanks to be made therein. When the mold is constructed as herein illustrated—that is, with its transverse interior wall of a less extent than the width of the wrapper which it is to receive—the side edges of the wrapper will extend above the top of the mold, and this leaves such side edges in position to be acted upon by a portion of the wrapper-folding mechanism without such portion of such mechanism entering the mold. This mold or groove is formed in the upper portion of a frame M, constructed and arranged to move in suitable ways, as shown in Figs. 21, 22, 38, 49, and 50. The ends of this frame are preferably square and solid, while the intermediate parts are cut away, leaving a web $l$, which connects the upper portion in which the groove is formed with the lower or base portion which slides in the ways, as shown in the above-named figures.

The frames M, each carrying a mold L, are preferably arranged in series of eight frames and are preferably arranged to be brought by a parallelogram movement to register in succession with the wrapper and tobacco-delivering mechanisms, already described, and with the wrapper folding and pasting mechanisms and the cigarette-cutter delivering mechanism, to be hereinafter described. This series of mold-carrying frames is shown in plan view in Fig. 48, in which the frames are moved in the direction indicated by the several arrows, the frames being preferably moved continuously along the sides N and N' of a parallelogram and intermittently across the ends O and O' of the same.

One of the series of the mold-carrying frames M is shown in its stationary position in Figs. 7 and 21, where one of the molds L is in registering position with the wrapper-guide $d^6$ and also with the tobacco-delivering channel J. After this mold has received its wrapper and the proper quantity of tobacco it is moved laterally in the direction of the arrow across the bed of the machine or end of parallelogram into position to be engaged by one of a series of rollers $m$ on one end of shafts $m'$, which are attached to and carried by a double endless chain $m^2$, which passes over a series of sprocket-wheels $m^3$. The movement of this chain draws the mold-carrying frames successively along the side N in the direction of the arrows till their ends reach the end O' of the parallelogram which is opposite the end where they receive the wrappers and the tobacco, and they are then pushed laterally in succession and preferably intermittently the distance of the width of each frame, one at a time, across the end O' by pushers $m^4$, pitmen $m^5$, cranks $m^6$, attached to one end of vertical shafts $m^7$, which are connected to a horizontal shaft $m^8$ by beveled gears, so that the pushers will act in unison to push the frames. Each frame is then engaged in succession by rollers $n$ on the end of shafts $n'$, which are attached to and carried by a double endless chain $n^2$, which passes over a series of sprocket-wheels $n^3$, whose movement draws the frames along the side N' back to the opposite end O, where the molds are pushed into position to again receive the wrappers and tobacco by pushers $n^4$ of similar construction and operation as the pushers $m^4$ at the end O'. These mold-frames move along and across the bed of the machine, suitable projections or ways being provided to keep them in proper positions.

After a mold L which has received its wrapper and charge of tobacco has been pushed over and has commenced its movement along the side N the mechanisms for compressing the tobacco and folding the wrapper around the tobacco filler commence to operate, and are described as follows: The compressing devices consist of a pair of clearers $o$ and a compressing-wheel P, the former of which act between the edges of the wrapper and the tobacco for the purpose of removing particles or bringing them into the path of the compressing-wheel P. These clearers preferably are thin pieces of metal or other suitable material and are suitably attached to the frame of the machine, so as to project down into the mold L between the edges of the wrapper and to come near or in slight contact with such edges and remove the tobacco therefrom. Directly over the free ends of these clearers $o$ there is a rock-shaft $o'$, mounted in suitable bearings and provided at its lower end with a disk $o^2$, which in turn is provided with two projections or pins $o^3$, which embrace the outer surfaces of the clearers $o$ near their ends in such manner that when the shaft $o'$ is rocked in one direction the clearers $o$ will be brought nearer together, so as to permit them to enter between the edges of the wrapper without disturbing its position, and when this shaft is rocked in the opposite direction the clearers $o$ are permitted to separate and approach to or come in contact with the inner surface of the wrapper near its edges to operate, as above described. The rock-shaft $o'$ is operated by another rock-shaft $o^4$, provided with an arm $o^5$, working in a forked arm $o^6$, attached to rock-shaft $o'$, the shaft $o^4$ being provided at its opposite end with an arm $o^7$, which is located so as to be in the path of the full or solid end of the mold-frame M and is moved out of such path by contact with such end, thus giving to the rock-shaft $o'$ the desired movement to bring the ends of the clearers toward each other sufficiently to permit them to enter between the wrapper edges in the mold. The thickness of the solid end of the mold-frame in the direction of its movement is sufficient to close and hold the clearers $o$ in the desired position till they have entered between the edges of the wrapper and when the free end of the arm $o^7$ has passed over this solid portion the clearers $o$, by reason of their resiliency, spring apart and cause the shafts $o'$ and $o^4$ to rock back to their normal position and bring the arm $o^7$ into position to be again operated by the advance end of the next mold.

The compressing-wheel P is located directly in advance of the clearers $o$, as shown in Figs. 30 and 50, and it is preferably provided with a semicylindrical periphery to give the filler of tobacco a corresponding shape. It is mounted on a shaft $p$, to the opposite end of which is attached its driving-wheel $p'$, and it is preferably provided with a doctor or scraper to remove any tobacco which may adhere to its periphery. The office of this wheel is to compress the tobacco in the mold, so that the tobacco filler can readily enter beneath a hood or cover Q in the mold, where the edges of the wrapper are folded down and pasted in position as the filler in its mold moves under this hood.

The wrapper-folding mechanism consists of the hood Q, fixed above the path of the filler as it is moved forward in the mold and having two wrapper-folding sections, between which the paste-applying device is preferably located. These sections are provided with spiral grooves $q$ and $q'$, formed in the sides of the hood, and with folders having spiral-shaped presser edges $q^2$ and $q^3$, preferably of about the same length as the grooves $q$ and $q'$, and short supplemental presser edges or starters $q^4$ and $q^5$ at the forward ends of the edges $q^2$ and $q^3$, which form, with the grooves, spiral guides by which the edges of the wrapper are gradually folded over upon the tobacco filler, as shown in Figs. 39 to 42 and 44 to 46, inclusive. The form and position of the grooves $q\ q'$ are more clearly shown in the views on Sheet 13, (see especially Fig. 55,) the pressure edges being removed from the hood, so that the view of the grooves will not be impeded. The pressure edges themselves are shown in Figs 59 and 60. The first section of this hood, provided with groove $q$, presser edge $q^2$, and supplemental presser edge or starter $q^4$, operates to start and fold one edge of the wrapper down upon the filler, and the second section, whose groove $q'$, presser edge $q^3$, and supplemental presser edge or starter $q^5$ are upon the opposite side from the groove $q$, presser edge $q^2$, and starter $q^4$, operates to start and fold the opposite edge of the wrapper after the paste has been applied thereto by the intermediate paste-applying device down upon the filler and to overlap the previously-folded edge. The supplemental presser edges or starters $q^4$ and $q^5$ preferably extend forward of their respective presser edges $q^2$ and $q^3$ and are located a short distance above those edges, so that they will escape the upper surfaces of the mold L and engage with the edges of the wrapper, which extend above the top of such mold and press or start such edges inward, so that the spiral guides formed by the grooves $q$ and $q'$ and presser edges $q^2$ and $q^3$ can readily receive and engage with such edges of the wrapper and continue the folding operation, as heretofore explained. The presser edges $q^2$ and $q^3$ are preferably located so that their forward ends, as well as other portions, will enter the molds L, the supplemental presser edges or starters moving the edges of the wrapper inward far enough to permit of this.

The paste-applying device consists of a paste-receptacle R, provided with a removable plunger $r$ to force the paste against the paste-applying wheel $r'$, which works in one side of the receptacle near its bottom, preferably at an angle of about forty degrees, and conveys and applies the paste to the edge of the wrapper. This wheel is mounted upon a shaft $r^2$, working in suitable bearings and provided at its opposite end with a pulley $r^3$, by which the wheel is driven by a belt $r^4$, which also drives the smoothing or finishing wheel, to be hereinafter described. This belt passes around the wheel $p'$, thence to a pulley on the finishing-wheel shaft, thence around a guide-pulley $r^5$, thence around the pulley $r^3$ on the paste-applying wheel-shaft, thence around the guide-pulley $r^6$, and thence back to the wheel $p'$.

The plunger $r$ is provided with a shaft $r^7$, sliding longitudinally in a bearing $r^8$, arranged at a sufficient height above the top of the receptacle R to permit the plunger to be raised entirely out of the receptacle and to swing away therefrom upon the bearing $r^9$, so as to leave the top of the receptacle open to receive a supply of paste, a handle $r^{10}$ being provided for operating the same. When the edge of the wrapper which has received the paste has been folded down to overlap the edge previously folded, the cigarette passes still farther under the hood Q and the overlapped edges are pasted together or sealed, and the seam is smoothed and finished by a wheel S, located slightly in advance of the end of the hood. The wheel S is the smoothing or finishing wheel, heretofore referred to, and is driven by the belt $r^4$, as before described, and is preferably revolved at a speed somewhat greater than the movement of the cigarette to increase the smoothing and finishing effect.

After the mold has entirely passed the finishing-wheel S and has reached the end O' of the bed of the machine, the cutter delivering mechanism operates to expel the cigarette-rods from the molds and deliver them to the cutters. This mechanism is composed of the ejectors, carriers, and holder. The ejectors consist of pins $s$ attached to a bar $s'$, so that the pins are directly beneath the center of the mold. The bar $s'$ moves in suitable ways in the bed of the machine and has attached to each of its ends one of the eccentric-rods $s^2$, which embrace eccentries $s^3$ on rotating shaft $s^4$, which eccentrics and rods cause the bar $s'$ to move up and down sufficiently to move the pins $s$ vertically through the mold-frame and mold and through a channel $s^5$ in the frame of the machine to lift the cigarette-rod into the position shown in dotted lines in Fig. 5, the mold-frame being provided with holes located to register with the pins $s$ when the mold-frame reaches the end O' of the bed. When the cigarette-rods have reached this position, they are caught by the carriers $s^6$, attached to arms $s^7$ of rock-shaft $s^8$, which is provided with an arm $s^9$, to which is attached one end of an eccentric-rod $s^{10}$, which embraces an eccentric $s^{11}$ on revolving shaft $s^4$. The rotation of the shaft $s^4$ and eccentric $s^{11}$ causes the shaft $s^8$ to rock back and forth sufficiently to enable the carriers $s^6$ to take the cigarette-rod from the position indicated in dotted lines in Fig. 5 and carry and deliver it to one of the longitudinal recesses in the periphery of the rotating holder $s^{12}$. This holder consists a roller mounted to rotate on shaft $s^{13}$, and is provided with longitudinal recesses $s^{14}$ to receive and deliver the cigarette-rods to the cutters and hold them while the cutters operate, and of circumferential recesses or grooves $s^{15}$ into which the ends of the carriers $s^6$ enter to deposit the cigarette-rods in the longitudinal recesses, and of a series of circumferential recesses or slits $s^{16}$ to receive rotating cutter-blades. The holder $s^{12}$ rotates in the direction indicated by the arrow in Fig. 5, and as the carriers $s^6$ enter the circumferential grooves $s^{15}$ the cigarette-rod is brought in contact with the periphery of the holder and is carried along over the same till it comes directly over one of the recesses $s^{14}$, when it drops into the recess and the carriers $s^6$ are free to return for another. The holder $s^{12}$ is rotated intermittently by ratchet $s^{17}$, attached to a shaft $s^{13}$, and a pawl $s^{18}$, attached to an arm $s^{19}$, which is also mounted on shaft $s^{13}$ and has attached to its free end one end of a connecting-rod $s^{20}$, the other end of which is connected to a pivoted arm or lever $s^{21}$, which carries a roller $s^{22}$, working upon a cam $s^{23}$, upon a shaft $s^4$, each rotation of which, by means of the above-named connections, moves the holder through one-fourth of a rotation.

The cutting-up mechanism consists of a series of rotating cutter-blades $t$, arranged upon a shaft $t'$ to register with the slits $s^{16}$, whose walls form anvils against which the cutter-blades act to cut the cigarettes into short lengths as they are brought in contact with the blades by the rotation of the holder $s^{12}$. The cutter-shaft $t'$ is driven by a gear-wheel $t^2$, attached thereto and geared with another similar wheel attached to a shaft $t^3$, which bears a pulley $t^4$, which receives a belt $t^5$, passing over a pulley $t^6$ on one of the main rotating shafts of the machine.

After the cigarettes are cut up, as above described, the marketable cigarettes are conveniently discharged by rolling down inclined planes or ways T, where they may be received in any suitable receptacle.

Having described the construction, arrangement, and operation of the several operative parts of the machine and generally their connection and relation with each other, I will now describe, commencing with the main driving-belt U, (shown in dotted lines in Fig. 7,) how movement is communicated to the several operative parts of the machine.

The belt U passes over a well-known form of loose and tight pulleys $u$, attached to the shaft carrying the picker-roll $f^5$, which shaft is also provided with a pulley over which a belt $u'$ passes to a pulley on the shaft carrying the picker-roll $g^5$, which shaft is also provided with a pulley over which passes a belt $u^2$ to a pulley on the shaft carrying the picker-roll $f^4$, thus driving the picker-rolls $f^5$, $g^5$, and $f^4$. The shaft carrying the picker-roll $g^5$ is provided with a third pulley over which a belt $u^3$ passes to a pulley on a shaft $u^4$, located beneath the bed of the machine, as shown in Figs. 1, 2, 3, 4, 5, and 7, which shaft $u^4$ also carries a pulley over which a belt $u^5$ passes to a pulley on the shaft $u^6$, carrying the cams $k'$ and cam $j^4$, and also carrying another pulley over which a belt $u^7$ passes to a pulley on shaft $u^8$, which shaft $u^8$ carries a pinion meshing with a gear-wheel on shaft $u^9$, which in turn carries one of the rollers $g'$, which roller gives motion to the feed-belt $g$, which passes over the roller $g'$, which roller carries a pulley over which a belt $u^{10}$ passes to a pulley on the shaft carrying the picker-roll $g^4$, and thus drives the feed-belt $g$ and picker-roll $g^4$. The shaft $u^9$ also carries a pulley over which a belt $u^{11}$ passes to a pulley on a shaft $u^{12}$, which shaft carries one of the rollers $f'$, over which the feed-belt $f$ passes to the other roller $f'$, which latter roller carries a pulley over which a belt $u^{13}$ passes to a pulley on the shaft which carries the picker-roll $f^3$, thus driving the feed-belt $f$ and the picker-roll $f^3$. The shaft $u^6$ operates to give the desired movements to the gatherer and compresser frame K, plunger I, and removable bottom $h^3$ of the hopper F, as hereinbefore described. The shaft $u^6$ is also provided with a beveled gear which meshes with another beveled gear on a vertical shaft $u^{14}$, which shaft carries upon its opposite end another beveled gear which meshes with a beveled pinion on a shaft $u^{15}$, which shaft also carries one of the paper-feed wheels $b^3$ of wrapper-printing mechanism and drives the same, the other feed-wheel $b^3$ being driven by frictional contact therewith. The shaft $u^{15}$ also carries a gear-wheel which meshes with a pinion upon the shaft $u^{16}$, which shaft carries the type-wheel $b'$ of the printing mechanism and drives the same. The shaft $u^{16}$ also carries a pinion which meshes with an intermediate pinion $u^{17}$, which in turn meshes with a gear-wheel on shaft $u^{18}$, which shaft carries the ink-distributing wheel $b^6$ and drives the same and is itself revolved in the same direction as shaft $u^{16}$. The inking-wheel $b^5$ and the spreading-wheel $b^7$ receive their motion by frictional contact with the wheel $b^6$, the wheel $b^7$ preferably having a longitudinal movement. The distributing-wheel $b^6$ is provided on its end nearest the plate where it is journaled with four short pins arranged at equal distances apart and near the periphery of the wheel, which as the wheel revolves come in contact with the end of a pivoted lever $u^{19}$ and lift the same a distance sufficient to bring the transfer-wheel $b^8$, which is journaled to this lever, in contact with the reservoir-wheel $b^9$, so that the wheel $b^8$ will be revolved by frictional contact with the wheel $b^9$ and will receive the desired quantity of ink therefrom, and as the pins on the end of the wheel $b^6$ pass from under the lever $u^{19}$ the lever and transfer-wheel $b^8$ are caused to move away from the wheel $b^9$ by the spring $u^{20}$, attached to the opposite end of the lever, and come in contact with the wheel $b^6$ and transfer ink thereto. The wheel $b^6$ is also provided on its same end with two studs, preferably carrying rollers arranged at the same distance from the shaft of the wheel and midway of its circumference and in line with two of the short pins before described, which rollers, as the wheel revolves, come in contact with one end of a lever $u^{21}$, pivoted on the shaft which carries the reservoir-wheel $b^9$, so as to lift the free end of the lever as the rollers pass under it, the lever being arranged in a different plane from the lever $u^{19}$, so that it is not affected by the short pins which operate said lever $u^{19}$. The opposite end of the lever $u^{21}$ carries a pawl $u^{22}$, working on a ratchet-wheel $u^{23}$, which is provided with the proper number of teeth to cause it to revolve the desired distance by the rising-and-falling action of lever $u^{21}$ and pawl $u^{22}$ to take the proper quantity of ink from the reservoir $b^{10}$.

The wrapper is fed from the printing mechanism to the wrapper-cutting mechanism C by the feed-wheels $b^3$, and the cutter $c$ is operated by an arm $c^2$, attached to the vertical shaft $u^{14}$, coming in contact with one end of the arm $c'$, as heretofore explained. The wrappers are fed by gravity from the cutter $c$ through the vertical part of the guide $d$ till its forward end comes in contact with and between the feed-belts $d'$ and $d^2$, (shown in Figs. 22 and 23,) and it is then advanced into the mold L by the action of these belts. The belt $d'$ is moved by frictional contact with the belt $d^2$, and the latter is moved by a belt passing over a pulley $d^7$ on a shaft carrying one of the pulleys $d^4$, which belt then passes over guide-pulleys $d^8$ to a pulley $d^9$ on the shaft $u^7$. The pivoted lever $e^5$, which operates the wrapper-adjusting mechanism, as heretofore described, is provided at one end with a roller working in a heart-shaped cam $e^{18}$, attached to the shaft $e^{19}$, which is provided with a beveled gear $e^{20}$, meshing in a beveled pinion on the shaft $u^4$.

The double endless chain $m^2$, which draws the molds along the side N of the bed of the machine, is moved by one pair of sprocket-wheels $m^3$, attached to the shaft $m^9$, which carries a pinion meshing with a gear-wheel on shaft $e^{19}$, described above.

The pushers $m^4$, which push the molds across the bed of the machine, as before described, are moved through their connection with the shaft $m^8$ by a beveled pinion thereon meshing with a beveled gear $m^{10}$ on a stud $m^{11}$, which gear is moved by the chain $m^2$ and rollers $m^{12}$ and $m^{13}$ on shafts $m'$, attached to said chain.

The beveled gear $m^{10}$ is moved intermittingly one-fourth of a revolution by the passage of each pair of rollers $m^{12}$ and $m^{13}$, attached to the shaft $m'$ and chain $m^2$, the rollers $m^{12}$ passing between the radial guides $m^{14}$, attached to the rear side of the gear-wheel $m^{10}$, the direction of the chain $m^2$ being such that the rollers $m^{12}$ remain in the guide $m^{14}$ until the wheel $m^{10}$ is given one-fourth of a revolution, when these rollers leave their guides by moving in a direction substantially at right angles to the direction of this movement when they entered said guides, as will readily be seen by reference to Fig. 52. The wheel $m^{10}$ is held in the proper registering position to receive the rollers $m^{12}$ by the spring-stop $m^{15}$ and spring locking-catch $m^{16}$, engaging with the exterior surfaces of the radial guides $m^{14}$, as shown in Fig. 52. The spring locking-catch $m^{16}$ is provided with an arm $m^{17}$, by means of which the catch is unlocked by the contact of the roller $m^{13}$ therewith, and it is brought into the locking position by the spring $m^{18}$. The arm $m^{17}$ when in the unlocked position rests against a stop $m^{20}$, which by reason of its peculiar shape forms a guide or path upon which the roller $m^{13}$ rides until it has moved the wheel $m^{10}$ one-fourth of a revolution and is ready to move out of the radial guides $m^{14}$, and as it so moves the arm $m^{17}$ follows it by the action of the spring $m^{18}$ and brings the locking-catch $m^{16}$ in position to lock the wheel $m^{10}$ against further forward movement. The spring-stop $m^{15}$ moves freely upon its pivot and away from the radial guides $m^{14}$ by their contact with such stop until the wheel $m^{10}$ has reached its registering position, when the spring $m^{21}$ causes the stop to move into position to lock the wheel $m^{10}$ against any rearward movement. The wheel $m^{10}$ is provided with as many pairs of radial arms $m^{14}$ as there are pairs of rollers $m^{12}$ and $m^{13}$ on the chain $m^2$, so that as each mold is drawn along the side N by such chain the preceding molds will be pushed across the bed of the machine by the revolution of the wheel $m^{10}$ and its connected parts, as before described.

The double endless chain $n^2$, which draws the molds along the side N' on their return movement, is moved by one pair of sprocket-wheels $n^3$, which are attached to the shaft $n^9$, which carries a pulley over which passes a belt to a pulley on the shaft $e^{19}$, already described. The pushers $n^4$, which push the molds across the bed of the machine at O, are operated in substantially the same way and by a similar means as the pushers $m^4$, which operate to push the molds across the end at O', and need not be further described, except to state that these parts are designated by the letter $n$ with numerals to correspond with the corresponding parts, which are designated by the letter $m$ with numerals.

The compressing-wheel P, paste-applying wheel $r'$, and finishing-wheel S are driven by their connection with the wheel $p'$, as before described, the wheel $p'$ being provided with a second groove, in which a belt $p^2$ passes to a pulley on shaft $n^9$.

The mechanism which delivers the cigarettes to the cutters to be cut up as well as the cutters themselves is driven by their connections with the shaft $s^4$, as heretofore described, the shaft $s^4$ being provided with a pulley over which a belt $s^{24}$ passes to a pulley on shaft $u^4$.

The operation of this machine as a whole has been sufficiently described in connection with the descriptions of the individual parts. It has been suggested that the molds should be slightly longer than the wrappers inserted therein. This is to enable the tobacco filler to extend slightly beyond the ends of the wrapper, so that the ends of the wrapper will be well filled with tobacco, and the filler can be cut off at each end close to the ends of the wrapper, but without interfering therewith. Preferably the feed aprons or belts $f$ and $g$ and the hopper F are of a width about equal to the length of the tobacco filler in the mold. The machine shown in the drawings is constructed to make cigarette-rods of a length to make eight individual cigarettes when cut up; but it is manifest that a machine constructed and operating upon substantially the same principle can be made to make longer or shorter rods, as desired.

The machine shown in the drawings and hereinbefore described embodies my improvements in what I consider to be their best and most practical form. It will be understood, however, that the apparatus is capable of many modifications without departure from my invention, and it will be understood that the various special arrangements and constructions specified are not to be understood as an essential part of any of the devices claimed, except where they are clearly referred to in the claims.

It is also manifest that the form of the wrapper-folding mechanism is immaterial so long as it operates to fold or wrap the wrapper around the mold or molds move relatively to the folding mechanism, and that this progressive folding or wrapping of the wrapper is the same whether the mold moves and the folding mechanism is stationary or the folding mechanism moves and the mold is stationary.

The movable mold herein shown and described can be moved by hand, if so desired, and yet the operation of such mold in combination with the wrapper feeding and folding and tobacco-feeding mechanism will be substantially the same as when moved by the mechanism herein shown and described. Again, the wrapper-feeding mechanism can be changed so as to have one part only, provided a portion of such changed feeding mechanism enters the mold to feed the wrapper therein, and the direction or directions in which such portion moves to enter the mold is immaterial, except when such feeding mechanism and mold register simultaneously with the tobacco-feeding mechanism. Again, the adjustable stop can be changed to move in one direction only when entering or leaving the mold, and the direction or directions in which the stop enters the mold is immaterial, except when the mold registers simultaneously with the wrapper and tobacco feeding mechanism.

The above changes, as well as others not herein referred to, will be manifest to any one skilled in the art to which this machine relates.

I claim—

1. In a cigarette-machine, the combination substantially as set forth, of a hopper provided with a movable bottom, means for opening and closing the movable bottom at predetermined times and mechanism for feeding an uninterrupted stream of tobacco upon the bottom of the hopper, whereby the quantity of tobacco for each filler is determined by the time the bottom of the hopper remains closed.

2. In a cigarette-machine, the combination substantially as set forth, of a hopper or receptacle for receiving tobacco, a movable hopper-bottom, mechanism for feeding an uninterrupted stream of tobacco upon the hopper-bottom, means for operating the movable bottom to open, close and retain the same in the closed position, such means being controlled by the speed of the machine, whereby the hopper will remain closed until the desired quantity of tobacco for a cigarette-filler is deposited therein and will then be opened to discharge the same and then be closed again.

3. In a cigarette-machine, the combination substantially as set forth, with a hopper provided with a movable bottom, mechanism for feeding an uninterrupted stream of tobacco upon the hopper-bottom, means for retaining the bottom in the closed position until the desired quantity of tobacco for a cigarette-filler is deposited thereon and means for opening said bottom to discharge the tobacco and then closing the same, of a receiving-surface located beneath the hopper, a gatherer or compressor and means for moving it along such receiving-surface, and a plunger and means for operating the same to force the tobacco into the filler-mold.

4. The combination of a mold adapted to receive a paper wrapper of definite length and a definite charge of tobacco, feed mechanism arranged to carry said mold and its contents longitudinally; a pair of cleaners arranged in the path of the mold for cleaning the tobacco away from the edges of the wrapper, and mechanism arranged to draw said cleaners in away from the sides of the mold as they enter the same.

5. The combination of a mold adapted to receive a paper wrapper of definite length and a definite charge of tobacco, and means for supplying a wrapper and tobacco thereto; mechanism for folding down the wrapper over the filler arranged to act as the mold moves longitudinally along it; mechanism arranged to move the mold laterally from the wrapper and tobacco supplying means into registering position with the folding mechanism, and mechanism arranged to move the said mold longitudinally along the folding mechanism.

6. The combination of a series of molds, each adapted to receive a wrapper of definite length and a definite charge of tobacco, a table or frame supporting said molds in a common plain, mechanism situated at each end of the table and arranged to carry the molds sidewise across the same, mechanism situated at each side of the table arranged to carry the molds longitudinally from one end thereof to the other, and mechanism arranged along one side of the table to fold down the edges of the wrapper on the filler as the mold moves longitudinally along it.

7. The combination of a series of molds, each adapted to receive a wrapper of definite length and a definite charge of tobacco; mechanism for folding down the edges of the wrapper, and mechanism arranged to move the molds in turn longitudinally along the folding mechanism and return them by a different path to a position registering with the folding devices; said mechanism operating as described to move the molds by a series of intermittent impulses permitting a rest between them.

8. The combination of a movable mold adapted to hold a wrapper of definite length; wrapper-feeding mechanism arranged to form a wrapper into a U form and thrust it endwise into the mold; a supplemental feeding device arranged to engage the wrapper and draw it to correct position in the mold, and means for moving the mold into and out of position to register with the wrapper-feeding mechanism.

9. In combination with a mold adapted to contain a wrapper of definite length; wrapper-feeding mechanism adapted to deliver a wrapper to the mold; a stop for the wrapper arranged to enter one end of the mold; an adjusting-finger arranged to enter the mold and to engage the wrapper and draw it to and against the stop and mechanism as described arranged to retract the stop and finger from the mold.

10. The combination of an intermittently-moving mold adapted to contain a wrapper of definite length; a wrapper-feeding mechanism with which the mold registers in one position of rest; said mechanism consisting as described of a device for thrusting a U-formed blank into the mold, and an adjusting device for bringing said blank-wrapper to correct position therein, and a tobacco-feeding mechanism arranged to register with the mold during the same position of rest, and to deliver a charge of tobacco thereto after the wrapper has been adjusted in the mold, and means for moving the mold into and out of registration with the wrapper and tobacco feeding mechanisms.

11. The combination with molds in which cigarettes are formed, of cutters adapted to sever a strip of paper into the desired wrapper-lengths and mechanism for feeding the strip of paper thereto, of a downwardly-extending guide, as *d*, located below the cutters through which the severed wrappers descend by gravity, and wrapper-feeding mechanism arranged to carry the blanks from the bottom of the guide and deliver them to the molds.

12. The combination with cutters adapted to sever a strip of paper into wrapper-blanks; of mechanism for continuously feeding the paper strip thereto and an intervening guide consisting of plates adapted to lie on each side of the paper strip, and formed so as to flare away above the cutters permitting the paper to buckle while the paper-cutters are in operation and directing it between the cutters when they open.

13. The combination with a mold in which cigarettes are formed, of tobacco-feeding mechanism adapted to register with the top of the mold in one position of rest, a guide-channel substantially flush with the top of the mold and provided with grooves upon its under edges registering with the edges of the mold, wrapper-feeding mechanism adapted to feed a U-formed wrapper-blank endwise into the mold so that its edges will pass through the said grooves, and means for intermittently moving the mold into and out of registering position with the wrapper and tobacco feeding mechanisms.

14. In a cigarette-machine, the combination substantially as set forth, with a mold in which the cigarette is formed, devices for disengaging the cigarette from the mold, and a series of cutters arranged to sever the cigarette into the desired lengths, of a cigarette-holder, as $s^{12}$, arranged to hold the cigarette and press it against the cutters, and an intermediate carrier arranged to take the cigarette from the disengaging devices and deliver it to the holder by a positive action, and means for operating the carrier and holder.

15. In combination with the mold and the mechanism for feeding the wrapper-blank endwise to the same; the adjusting-finger $e^2$ the slide $e$ to which said finger is attached, and which thrusts it into and withdraws it from the mold; the slide $e'$ actuated by slide $e$ as described, the cam $e^{14}$, the pin $e^{15}$ carried by slide $e'$ and moved up and down by cam $e^{14}$, said pin lying below finger $e^2$ and serving to support it as it enters the mold and to permit it to fall and engage the wrapper-blank at a proper position.

16. The combination in a cigarette-machine, substantially as set forth, of a mold, the slide $e$, the lever $e^2$, the slide $e'$, the rod $e^3$, the lever $e^3$, the pin $e^{13}$, the inclined cams $e^{12}$, the pin $e^{15}$, inclined cam $e^{14}$, pin $e^{16}$, inclined cam $e^{17}$, and spring $e^{11}$, whereby the levers $e^2$, and $e^3$, are moved into and out of the mold to feed and stop the wrapper therein.

17. The combination in a cigarette-machine, substantially as set forth, of a movable mold, mechanism for moving the same composed of two parts, one of which parts moves continuously and the other intermittently, and a locking device whereby the intermittently-moving part is locked during the intermission between its movements and is unlocked to permit it to move.

18. The combination in a cigarette-machine, substantially as set forth, of a divided or two-part mold-moving mechanism and means for connecting the two parts together, whereby the continuous movement of one part will give an intermittent movement to the other part.

19. The combination in a cigarette-machine, substantially as set forth, of a divided or two-part mold-moving mechanism, means for connecting the two parts together and a locking mechanism, whereby the continuous movement of one part will give an intermittent movement to the other part and will also operate the locking device to permit such part to move.

20. In a wrapper-folding mechanism for cigarette-machines, the combination substantially as set forth, with a mold, adapted to receive a wrapper and a tobacco filler, and means for operating the same, of a guide and a supplemental presser edge or starter, whereby the edge of the wrapper is received and pressed or started inward by the presser edge or starter and is directed into the guide.

21. In a wrapper-folding mechanism for a cigarette-machine, the combination substantially as set forth, with a mold, adapted to receive a wrapper and a tobacco filler, and means for operating the same, of a device, as Q, having two spiral guides, and two supplemental presser edges or starters, whereby the two edges of the cigarette-wrapper are received and pressed or started inward by such presser edges or starters and are directed into the spiral guides.

22. In a wrapper-folding mechanism for cigarette-machines, the combination substantially as set forth, with a mold, adapted to receive a wrapper and a tobacco filler, and means for operating the same, of a hood, one or more spiral guides, as $q$ and a presser edge as $q^2$.

JAMES A. BONSACK.

Witnesses:
ROBT. F. GAYLORD,
ROBT. H. DUNCAN.